Patented May 1, 1951

2,551,087

UNITED STATES PATENT OFFICE 2,551,087

POLYETHYLENE-WAX LAMINATING COMPOSITION

Philip S. Barnhart, West Springfield, and John C. Miller, Westfield, Mass., assignors to Westfield River Paper Company, Inc., Russell, Mass., a corporation of Massachusetts No Drawing. Application November 3, 1945, Serial No. 626,570

7 Claims. (Cl. 260—23)

This invention relates to an improved laminating cement, and particularly to such a cement used to unite or laminate sheets of paper or like material, commonly used for wrapping or packaging a wide range of commodities.

The laminating cement of our invention will be described from the point of view of its efficacy in the lamination of glassine, greaseproof, other dense papers, metallic foils, cellophane, cellulose acetate, Pliofilm, or vinyl sheetings and other hard surfaces sheet or film-like materials to each other or to one or more different materials falling within this category, in order to produce a laminated material which may thereafter be formed into envelopes, bags, containers, pouches and other enclosures. This cement, however, is useful in other fields so it is to be kept in mind that the use described is merely illustrative and is not to be considered in a limiting sense.

Heretofore, thermoplastic laminating cements relied largely upon rubber or certain synthetic materials as the agent to impart flexibility, toughness and additional adhesion to them and maintain these properties through the range of operations to which the material laminated by use of such cement was subjected. These agents were lacking in many attributes needed in both the making of a suitable cement and the maintaining of that cement in desired state once it was made. Their working characteristics were not staisfactory in a suitable range of proportions with a sufficient number of the variety of waxes employed as the principal element of most laminating cements. When mixed with those with which they were compatible, they often failed to produce a fully commercially usable cement. As an example of this, it is our experience that rubber, when mixed with the lower quality waxes, such as wax extenders, needed to be added in substantial amount to prevent those waxes from flowing too readily under the heat applied in the converting operations, but when that was done, the excessive amount of rubber detracted from the resistance of the cement to moisture vapor transmission in too great an extent to enable them to be used for the purposes intended. If, on the other hand, insufficient rubber or comparable material was introduced into the cement, the viscosity and melting point of the same would be too low and the cement would either strike through the paper sheet or would cause a large number of separations in the laminated material when the same was used for the packaging of foods at relatively high temperatures. This was not only unsightly but created considerable variation in the moisture vapor transmission rates throughout the sheet, and also produced a package of questionable strength characteristics.

The handling of rubber and the earlier substitutes in the making of the cement was also quite a problem. They required considerable milling with wax or other ingredients of the cement in order to render them sufficiently dispersable for relatively quick dissolving in the hot wax mixture. Without pre-milling, the dissolving time was multiplied five or six times over.

We have discovered, however, that the above and other defects of prior art cements are eliminated when the rubber component is replaced by polyethylene. Polyethylene is manufactured by polymerizing ethylene ($CH_2$—$CH_2$) in liquid form. A straight chain polymer is produced at high pressures and high temperatures and the resulting material covers a wide range of molecular weights. Polyethylene as presently produced is translucent off white in color, flexible, thermoplastic, can be admixed with dyes or pigments, and can also be molded into various shapes and forms. Its chemical structure is

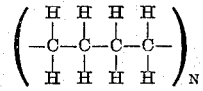

and the present molecular weight extends up to 40,000.

To begin with, we have found polyethylene having a molecular weight of no less than 15,000 to be compatible with a large variety of waxes, many resins and many plasticizers. In fact, it is compatible in all proportions with paraffin wax, amorphous petroleum wax and micro-crystalline wax. In addition, it can be used very advantageously where normal petroleum waxes are not available, and where wax extenders and high melting point petrolatums must be relied upon for the wax component. Wax extenders made from such materials as scale bottoms, high melting petrolatums, bituminous matter, or low melting crystalline paraffin wax, mixed with a small proportion of micro-crystalline wax, have a high penetration, are greasy to the feel, have little adhesive properties and low melting points. These characteristics are most deleterious from the point of view of the forming of laminating cements and they are difficult to overcome by the use of rubber or the earlier substitutes. When polyethylene is employed, however, the strength and toughness of these lower grade waxes are increased, the penetration is lowered, and their other undesirable features are so minimized that they can properly be used as an effective component of a commercially usable adhesive.

The use of polyethylene has other marked advantages in that it increases the melting point of wax base thermoplastics and does not interfere with the moisture vapor transmission rates of the adhesive. When used in proper proportions with other ingredients, it assists in producing excellent moisture barrier characteristics.

In addition, we have discovered that, when used in a mix containing waxes, resins and plasticizers to form the laminating cement, polyethylene improved the "clinging" characteristics thereof over the materials formerly used in place of it. This is a most important improvement in the art and one that is felt over a wide range, for the characteristic is present whether the laminated material employing polyethylene in its cement is used to package frozen foods at 30° below zero, to package material in a heated state, or when containers made of the laminated material are heat sealed. Not only does the polyethylene retain the "clinging" characteristics at low temperatures, but it also maintains its flexibility. In addition, the messiness caused by the flowing of prior art cements, when subjected to a sealing iron, and the separations of the plies when the laminated material is employed for the packaging of heated foods are substantially eliminated. The high softening point and the inherent viscosity of the polyethylene assure these improvements when the proper quantity of polyethylene is incorporated in the mix. What these characteristics impart to the cement due to the inclusion of polyethylene therein, may be generally described as "resistance to separation." In other words, the power of the cement to cling or adhere to the materials laminated is greatly enhanced while at the same time the internal strength of the cement is likewise increased.

Particular purposes call for the application of a wide variety of laminants. This variety, however, could not ordinarily be supplied, using prior art materials since, as has been previously pointed out, the quantity of rubber that could be used in a mix without introducing undesirable characteristics, was greatly limited. Such, we have found, is not the case when polyethylene is employed for, though the use of it up to ten per cent in a laminant makes a very desirable general purpose product, it can be used in much higher proportions, if necessary, to make laminated structures for particular performance to satisfy particular conditions. Furthermore we have found that the use of a relatively minute proportion of polyethylene makes an appreciable difference in the working properties of the cement. In fact we have found that polyethylene can be used in from 0.1–20% of the total mix of the laminant depending upon the performance desired.

Polyethylene has the additional advantage of ease of handling in the making up of the cement. It eliminates the pre-milling required to render previous materials usable, since it is obtainable in a form of granules that enables it to be poured directly into the molten bath of the hot wax mixture. In this bath, it goes into solution under the effects of agitation and heat in a relatively short time, so long as the proper temperature and speed of agitation are employed.

As has been already pointed out, polyethylene is compatible in all proportions with the higher grade waxes such as paraffin wax, amorphous petroleum wax, and micro-crystalline wax. In addition, it also renders wax extenders and high melting point petrolatums usable as the wax base of an adhesive since it adds strength and toughness to them, lowers their penetration, and minimizes their other undesirable features. These mixtures of polyethylene and wax can be plasticized and their adhesive properties can be increased if desired. We have found that a variety of plasticizers may be added to the polyethylene wax mixtures to give them definitely softer characteristics. Among such plasticizers are butyl stearate, di-butyl sebacate, di-butyl phthalate, tri-butyl phophate, petrolatum, Staybelite Ester No. 1, di-capryl phthalate, the hydrogenated methyl ester of rosin, known as Hercolyn, and many others.

If polyethylene alone is mixed with any of the plasticizers just mentioned, satisfactory performance can be attained with limitations, for polyethylene by itself tolerates only a certain amount of plasticizer. If greater amounts are used, the plasticizer will not remain in the polyethylene but will exude to the surface. When, however, the polyethylene is mixed with wax, as just stated, plasticizing may be carried on to a greater degree, since the exudation does not take place as readily, and a much more satisfactory mix can be produced.

The mixture of polyethylene and wax is compatible with numerous and varied resins, thus the adhesiveness of a compound of these materials can be readily increased to provide a laminating cement of improved characteristics. Among the wide variety of resins usable are wood rosin, gum rosin, polymerized rosin known as Polypale resin, hydrogenated rosin known as Staybelite resin, the di-ethylene glycol ester of rosin known as Flexalyn, the ethylene glycol ester of rosin known as Flexalyn C, ester gum, the glycerol ester of hydrogenated rosin known as Staybelite Ester No. 10, the polymers of beta pinene known as Piccolyte, cumaron-idene resins known as Cumar Resins P-10, P-25, and P-50, and the ethylene glycol ester of hydrogenated rosin known as Staybelite Ester No. 1.

We have found the following procedure to be effective in the making of a laminating cement incorporating polyethylene. First the wax of one of the types above referred to is heated to a temperature of approximately 230° F., at which temperature it is delivered to a steam jacketed mixing kettle already heated to that temperature. Thereafter slow agitation is provided as the wax is heated to a temperature of 235°–250° F. Should it be desired to use a plasticizer in the mix, the same is added to the molten wax at this stage. The polyethylene is next added slowly in granular form to the wax or wax plasticizer mixture, as the case may be, while gentle agitation takes place and the mixing is continued for a period of four hours or for such time as is necessary to have the polyethylene completely dispersed in the wax or wax plasticizer mixture.

The final step is the addition of the resin or resin-combination to the wax-polyethylene, paraffin-polyethylene, or wax-plasticizer-polyethylene dispersion, as the case may be. After this addition of the resin, it is permitted to melt before agitation is resumed. Thereafter, sufficient agitation is effected to form a thorough homogeneous mix, whose temperature is then dropped to 220–225° F., which temperature is maintained while the mix is in storage, ready for use. The following are examples of formulas for polyethylene laminants which we have found to present the improvements in laminants of our invention as above discussed:

(1) 80% wax
    10% polyethylene
    10% petrolatum
(2) 70% micro-crystalline wax
    20% polymerized rosin
    10% polyethylene
(3) 75% micro-crystalline wax
    24.9% polymerized rosin
    0.1% polyethylene
(4) 67% micro-crystalline wax
    20% polymerized rosin
    5% polyethylene
    8% of either butyl stearate, petrolatum or Hercolyn Laminants produced in accordance with the formula numbered 4 can be given different characteristics by selectively including any one of the plasticizers mentioned.

To sum up the improvements in the cement of our invention, there is first and foremost the ability of the cement to resist separation of the plies through a wide range of conditions. As a corollary to this there is the increased capability of the cement to cling or adhere to the faces of the plies. In addition, the polyethylene, part for part, reduces the flowing characteristics of the cement—when contrasted with prior art cements, and increases the melting point of the same though the flexibility is maintained. Finally, the incorporation of polyethylene in the cement enables the use of other components previously avoided due to inferior qualities which rendered the finished laminated product ineffective for the purposes intended.

What we claim as new and desire to obtain Letters Patent for is:

1. A laminating cement comprising micro-crystalline wax, polyethylene, a resin compatible with the mixture of wax and polyethylene, and a plasticizer, said wax being present in from 67–80% of the total, said polyethylene being present in from 0.1 to approximately 10% of the total, said resin being present in from 20–25% of the total and said plasticizer being present in from 8–10% of the total.

2. A laminating cement comprising wax, polyethylene, a resin compatible with the mixture of wax and polyethylene, and a plasticizer, said wax being present in from 67–80% of the total, said polyethylene being present in from 0.1 to approximately 10% of the total, said resin being present in from 20–25% of the total and said plasticizer being present in from 8–10% of the total.

3. A laminating cement comprising substantially 75% micro-crystalline wax, substantially 24% polymerized rosin and substantially 0.1% polyethylene.

4. A laminating cement comprising micro-crystalline wax, polyethylene, a resin compatible with a mixture of wax and polyethylene, and a plasticizer, said micro-crystalline wax being present in substantially 67% of the total, said resin being present in substantially 20% of the total, said polyethylene being present in substantially 5% of the total, and said plasticizer being present in substantially 8% of the total.

5. A laminating cement comprising wax, polyethylene and butyl stearate, said wax being present in approximately 80% of the total, said polyethylene being present in approximately 10% of the total, and said butyl stearate being present in approximately 10% of the total.

6. A laminating cement comprising wax, polyethylene and petrolatum, said wax being present in approximately 80% of the total, said polyethylene being present in approximately 10% of the total, and said petrolatum being present in approximately 10% of the total.

7. A laminating cement comprising wax, polyethylene and the hydrogenated methyl ester of rosin, said wax being present in approximately 80% of the total, said polyethylene being present in approximately 10% of the total, and said hydrogenated methyl ester of rosin being present in approximately 10% of the total.

PHILIP S. BARNHART.
JOHN C. MILLER.

REFERENCES CITED

The following references are of record in the file of this patent:

UNITED STATES PATENTS

| Number | Name | Date |
|---|---|---|
| 2,298,846 | Skooglund | Oct. 13, 1942 |
| 2,339,958 | Sparks | Jan. 25, 1944 |

OTHER REFERENCES

British Plastics April 1945, pages 148 and 149; May 1945, pages 96, 213–214.